(12) United States Patent
Chung et al.

(10) Patent No.: US 9,826,385 B2
(45) Date of Patent: Nov. 21, 2017

(54) APPARATUS AND METHOD FOR SELECTING PEER DISCOVERY RESOURCE IN DEVICE-TO-DEVICE COMMUNICATION SYSTEM

(71) Applicants: Samsung Electronics Co., Ltd., Gyeonggi-do (KR); Research & Business Foundation Sungkyunkwan University, Gyeonggi-do (KR)

(72) Inventors: Min-Young Chung, Seoul (KR); Seung-Hoon Park, Seoul (KR); Ja-Heon Gu, Seoul (KR); Dae-Gyun Kim, Gyeonggi-do (KR); Hyun-Seok Ryu, Gyeonggi-do (KR); Sueng-Jae Bae, Gyeonggi-do (KR); Chi-Woo Lim, Gyeonggi-do (KR)

(73) Assignees: SAMSUNG ELECTRONICS CO., LTD., Suwon-si (KR); RESEARCH & BUSINESS FOUNDATION SUNGKYUNKWAN UNIVERSITY, Suwon-si (KR)

( * ) Notice: Subject to any disclaimer, the term of this patent is extended or adjusted under 35 U.S.C. 154(b) by 0 days.

(21) Appl. No.: 14/911,251

(22) PCT Filed: Jul. 31, 2014

(86) PCT No.: PCT/KR2014/007042
§ 371 (c)(1),
(2) Date: Feb. 9, 2016

(87) PCT Pub. No.: WO2015/020352
PCT Pub. Date: Feb. 12, 2015

(65) Prior Publication Data
US 2016/0198330 A1    Jul. 7, 2016

(30) Foreign Application Priority Data
Aug. 9, 2013 (KR) .......................... 10-2013-0094958

(51) Int. Cl.
*H04W 72/12* (2009.01)
*H04W 8/00* (2009.01)
(Continued)

(52) U.S. Cl.
CPC ........... *H04W 8/005* (2013.01); *H04W 72/02* (2013.01); *H04W 76/023* (2013.01); *H04L 1/00* (2013.01); *H04W 88/04* (2013.01); *H04W 92/18* (2013.01)

(58) Field of Classification Search
None
See application file for complete search history.

(56) References Cited

U.S. PATENT DOCUMENTS

2010/0317291 A1* 12/2010 Richardson ....... H04W 74/0825
455/63.1
2011/0317569 A1* 12/2011 Kneckt .................... H04L 5/00
370/252
(Continued)

FOREIGN PATENT DOCUMENTS

WO    WO 2013/012222 A2    1/2013
WO    WO 2013/025057 A2    2/2013
(Continued)

OTHER PUBLICATIONS

International Search Report dated Nov. 6, 2014 in connection with International Application No. PCT/KR2014/007042; 4 pages.
(Continued)

*Primary Examiner* — Andrew Lai
*Assistant Examiner* — Jamaal Henson

(57) ABSTRACT

The present disclosure relates to a pre-5th-generation (5G) or 5G communication system to be provided for supporting higher data rates beyond 4th-generation (4G) communication system such as a long term evolution (LTE). The present invention relates to a method for selecting, by a device, a
(Continued)

FIG.1 peer discovery resource (PDR) in a device-to-device (D2D) communication system, the method comprising the steps of: determining a PDR selection range which can be selected by the device; and selecting a PDR in the determined PDR selection range.

16 Claims, 13 Drawing Sheets

(51) Int. Cl.
    *H04W 72/02* (2009.01)
    *H04W 76/02* (2009.01)
    *H04L 1/00* (2006.01)
    *H04W 92/18* (2009.01)
    *H04W 88/04* (2009.01)

(56) References Cited

U.S. PATENT DOCUMENTS

| | | | |
|---|---|---|---|
| 2012/0059935 A1 | 3/2012 | Patil et al. | |
| 2013/0066966 A1* | 3/2013 | Patil | H04W 8/005 709/204 |
| 2013/0109301 A1 | 5/2013 | Hakola et al. | |
| 2014/0126417 A1 | 5/2014 | Kang et al. | |
| 2014/0286293 A1 | 9/2014 | Jang et al. | |
| 2014/0315562 A1 | 10/2014 | Lim et al. | |
| 2015/0296443 A1 | 10/2015 | Lim et al. | |

FOREIGN PATENT DOCUMENTS

| | | |
|---|---|---|
| WO | WO 2013/062351 A1 | 5/2013 |
| WO | WO 2013/077684 A1 | 5/2013 |

OTHER PUBLICATIONS

Written Opinion of the International Searching Authority dated Nov. 6, 2014 in connection with International Application No. PCT/KR2014/007042; 5 pages.

Baccelli, et al.; "On the Design of Device-to-Device Autonomous Discovery"; COMSNETS; Bangalore, India; Jan. 3-7, 2012; 11 pages.

"Selection Procedures for the Choice of Radio Transmission Technologies of the UMTS": UMTS; TR 101 112; V3.2.0 (Apr. 1998); 84 pages.

"Feasibility Study for Proximity Services (ProSe)"; Technical Specification Group Services and System Aspects; 3GPP TR 22.803; V12.1.0 (Mar. 2013); 45 pages.

* cited by examiner

APPARATUS AND METHOD FOR SELECTING PEER DISCOVERY RESOURCE IN DEVICE-TO-DEVICE COMMUNICATION SYSTEM

CROSS-REFERENCE TO RELATED APPLICATIONS

The present application claims priority under 35 U.S.C. §365 to International Patent Application No. PCT/KR2014/007042 filed Jul. 31, 2014, entitled "APPARATUS AND METHOD FOR SELECTING PEER DISCOVERY RESOURCE IN DEVICE-TO-DEVICE COMMUNICATION SYSTEM", and, through International Patent Application No. PCT/KR2014/007042, to Korean Patent Application No. 10-2013-0094958 filed Aug. 9, 2013, each of which are incorporated herein by reference into the present disclosure as if fully set forth herein.

TECHNICAL FIELD

The present disclosure relates to an apparatus and method for selecting a peer discovery resource (PDR) in a device-to-device (D2D) communication system, and more particularly, to an apparatus and method for selecting a PDR thereby enhancing discovery performance in a D2D communication system.

BACKGROUND ART

To meet the demand for wireless data traffic, which has increased since deployment of 4th generation (4G) communication systems, efforts have been made to develop an improved 5th generation (5G) or pre-5G communication system. Therefore, the 5G or pre-5G communication system is also called a 'beyond 4G network' or a 'post long-term evolution (LTE) system'.

It is considered that the 5G communication system will be implemented in millimeter wave (mmWave) bands, e.g., 60 GHz bands, so as to accomplish higher data rates. To reduce propagation loss of radio waves and increase a transmission distance, a beam forming technique, a massive multiple-input multiple-output (MIMO) technique, a full dimensional MIMO (FD-MIMO) technique, an array antenna technique, an analog beam forming technique, and a large scale antenna technique are discussed in 5G communication systems.

In addition, in 5G communication systems, development for system network improvement is under way based on advanced small cells, cloud radio access networks (RANs), ultra-dense networks, a device-to-device (D2D) communication, a wireless backhaul, a moving network, a cooperative communication, coordinated multi-points (CoMP), reception-end interference cancellation, and the like.

In the 5G system, a hybrid frequency shift keying (FSK) and quadrature amplitude modulation (QAM) modulation (FQAM) and a sliding window superposition coding (SWSC) as an advanced coding modulation (ACM) scheme, and a filter bank multi carrier (FBMC) scheme, a non-orthogonal multiple Access (NOMA) scheme, and a sparse code multiple access (SCMA) scheme as an advanced access technology have been developed.

Generally, in a D2D communication system, a device identifies neighbor devices which are proximate to the device itself, and transmits and receives data by establishing a radio link with a specific neighbor device if necessary. This process for establishing a radio link and transmitting and receiving data is locally performed among devices without assistance of additional apparatus, so a D2D communication system has an advantage that rapid market introduction is possible without additional infrastructure compared to other wireless communication system. Further, a D2D communication system may solve a traffic overload problem which is concentrated on a base station or an access point (AP) by locally accepting data traffic.

So, a standard organization such as a 3RD generation partnership project (3GPP), and a institute of electrical and electronics engineers (IEEE) has standardized a D2D communication standard based on long-term evolution advanced (LTE-A), wireless-fidelity (Wi-Fi), and/or the like, and various D2D communication schemes have been developed.

Recently, a 3GPP has actively progressed a standardization study for supporting a proximity service among devices. Specially, a D2D communication scheme which may increase a data rate between neighbor devices and may decrease transmission delay between the neighbor devices has been considered as a scheme which is appropriated for supporting the proximity service among the devices. Here, in order for the D2D communication scheme to effectively support the proximity service among the devices, a device needs to discover other devices which are located around the device without assistance of a base station or an AP, and identify the discovered devices.

So, a device discovery scheme in which the device informs presence of the device to neighbor devices and acquires information of the neighbor devices becomes an importance element for effectively supporting the proximity service.

Meanwhile, device discovery schemes have been variously proposed, and a discovery scheme as one device discovery scheme among the device discovery schemes will be described below.

The discovery scheme is a scheme in which devices individually transmit discovery messages which inform presence of the devices and receive discovery messages which are transmitted in other devices through a peer discovery resource (PDR) which is configured based on an orthogonal frequency division multiplexing (OFDM) scheme.

In the discovery scheme, each device considers an energy level which is detected at each PDR for individually selecting a PDR through which each device will transmit a discovery message. That is, each device randomly selects one PDR from among low L % PDRs, e.g., 5% PDRs among detected PDRs based on an energy level, and transmits a discovery message through the selected PDR thereby neighbor devices may discover the device.

If a plurality of devices are densely located at a relatively narrow area, energy levels which are detected in the plurality of devices are similar, so a case that the plurality of devices select the same PDR. If a discovery message which is transmitted in each of the plurality of devices is transmitted through the same PDR, neighbor devices may not identify the devices which transmit the discovery messages through the same PDR due to overlap of the discovery messages, and this will be described below.

Firstly, each device randomly selects one PDR among low L % PDRs based on energy levels of PDRs which are measured in each device, and transmits a discovery message through the selected one PDR. Here, if each of neighbor devices measures energy levels for PDRs one another, the energy levels for the PDRs which are measured in each of the neighbor devices becomes similar. Specially, if devices of which the number corresponds to L % of a total number of PDRs or more than L % perform a PDR selecting operation at the same time, a probability that PDRs which are duplicately selected occur becomes high even though each of the devices randomly selects one PDR among PDRs which have low L % energy level.

Here, a problem which may occur if devices which are densely located select the same PDR for transmitting a discovery message in a general D2D communication system will be described with reference to FIG. 1.

FIG. 1 schematically illustrates a problem which may occur if devices which are densely located select the same PDR for transmitting a discovery message in a general D2D communication system.

Referring to FIG. 1, in the D2D communication system, it will be assumed that two devices, i.e., a device #1 111 and a device #2 113 are adjacent each other, and energy levels for PDRs which are measured in each of the device #1 111 and the device #2 113 are similar. If a total number of PDRs which are usable in the D2D communication system is 20, the number of PDRs which have low L % energy level, e.g., low 5% energy level becomes 1.

So, each of the device #1 111 and the device #2 113 selects one PDR which has low 5% energy level, and the PDR which is selected in each of the device #1 111 and the device #2 113 may be the same since the device #1 111 and the device #2 113 are adjacent each other. In this case, since the device #1 111 and the device #2 113 select the same PDR, a discovery message which is transmitted in each of the device #1 111 and the device #2 113 is overlapped and transmitted through the same PDR. Due to this, other devices may not the device #1 111 and the device #2 113.

Meanwhile, in the discovery scheme, a specific device considers only an energy level of a related PDR without considering whether other devices use the related PDR upon selecting a PDR for transmitting a discovery message, so a problem may occur, and this will be described below.

Firstly, it will be assumed that devices which perform a D2D communication already use all PDRs which are usable in a D2D communication system. In a case that all usable PDRs are used, if a new device accesses the D2D communication system, the new device selects one PDR using the discovery scheme based on a preset peer device discovery period, and transmits a discovery message using the selected one PDR.

However, the one PDR which is selected in the new device is a PDR which is used already in a specific device. Due to this, devices which transmit a discovery message through the one PDR may not be identified. So, in the D2D communication system, the more increased the number of devices which perform a D2D communication, the more decreased the number of discovered devices is.

So, in a D2D communication system, there is a need for a PDR selecting scheme which may decrease overlap of discovery message transmission, i.e., a discovery message collision.

The above information is presented as background information only to assist with an understanding of the present disclosure. No determination has been made, and no assertion is made, as to whether any of the above might be applicable as prior art with regard to the present disclosure.

DISCLOSURE

Technical Problem

An embodiment of the present disclosure proposes an apparatus and method for selecting a PDR in a D2D communication system.

An embodiment of the present disclosure proposes an apparatus and method for selecting a PDR thereby increasing discovery performance in a D2D communication system.

An embodiment of the present disclosure proposes an apparatus and method for selecting a PDR thereby minimizing a discovery message collision in a D2D communication system.

An embodiment of the present disclosure proposes an apparatus and method for selecting a PDR thereby minimizing delay in selecting a peer device in a D2D communication system.

An embodiment of the present disclosure proposes an apparatus and method for selecting a PDR thereby preventing unnecessary transmission of a discovery message in a D2D communication system.

Technical Solution

In accordance with an aspect of the present disclosure, a device in a device-to-device (D2D) communication system is provided. The device includes a control unit configured to determine a peer discovery resource (PDR) selecting range which is possible to select in the device, and select a PDR in the PDR selecting range.

In accordance with another aspect of the present disclosure, a method for selecting a peer discovery resource (PDR) by a device in a device-to-device (D2D) communication system is provided. The method includes determining a PDR selecting range which is possible to select in the device; and selecting a PDR in the PDR selecting range.

Advantageous Effects

An embodiment of the present disclosure enables to select a PDR thereby increasing discovery performance in a D2D communication system.

An embodiment of the present disclosure enables to select a PDR thereby minimizing a discovery message collision in a D2D communication system.

An embodiment of the present disclosure enables to select a PDR thereby minimizing delay in selecting a peer device in a D2D communication system.

An embodiment of the present disclosure enables to select a PDR thereby preventing unnecessary transmission of a discovery message in a D2D communication system.

DESCRIPTION OF DRAWINGS

The above and other aspects, features and advantages of certain exemplary embodiments of the present disclosure will be more apparent from the following description taken in conjunction with the accompanying drawings, in which.

Throughout the drawings, it should be noted that like reference numbers are used to depict the same or similar elements, features, and structures.

MODE FOR INVENTION

Figure 1:
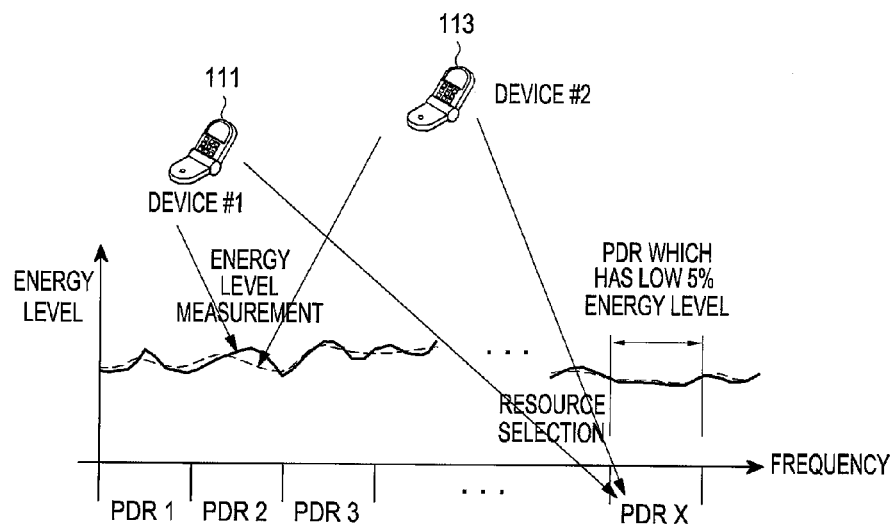
FIG. 1 schematically illustrates a problem which may occur if devices which are densely located select the same PDR for transmitting a discovery message in a general D2D communication system.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Although ordinal numbers such as "first," "second," and so forth will be used to describe various components, those components are not limited herein. The terms are used only for distinguishing one component from another component. For example, a first component may be referred to as a second component and likewise, a second component may also be referred to as a first component, without departing from the teaching of the inventive concept. The term "and/or" used herein includes any and all combinations of one or more of the associated listed items.

The terminology used herein is for the purpose of describing various embodiments only and is not intended to be limiting. As used herein, the singular forms are intended to include the plural forms as well, unless the context clearly indicates otherwise. It will be further understood that the terms "comprises" and/or "has," when used in this specification, specify the presence of a stated feature, number, step, operation, component, element, or combination thereof, but do not preclude the presence or addition of one or more other features, numbers, steps, operations, components, elements, or combinations thereof.

The terms used herein, including technical and scientific terms, have the same meanings as terms that are generally understood by those skilled in the art, as long as the terms are not differently defined. It should be understood that terms defined in a generally-used dictionary have meanings coinciding with those of terms in the related technology.

According to various embodiments of the present disclosure, an electronic device may include communication functionality. For example, an electronic device may be a smart phone, a tablet personal computer (PC), a mobile phone, a video phone, an e-book reader, a desktop PC, a laptop PC, a netbook PC, a personal digital assistant (PDA), a portable multimedia player (PMP), an mp3 player, a mobile medical device, a camera, a wearable device (e.g., a head-mounted device (HMD), electronic clothes, electronic braces, an electronic necklace, an electronic appcessory, an electronic tattoo, or a smart watch), and/or the like.

According to various embodiments of the present disclosure, an electronic device may be a smart home appliance with communication functionality. A smart home appliance may be, for example, a television, a digital video disk (DVD) player, an audio, a refrigerator, an air conditioner, a vacuum cleaner, an oven, a microwave oven, a washer, a dryer, an air purifier, a set-top box, a TV box (e.g., Samsung HomeSync™, Apple TV™, or Google TV™), a gaming console, an electronic dictionary, an electronic key, a camcorder, an electronic picture frame, and/or the like.

According to various embodiments of the present disclosure, an electronic device may be a medical device (e.g., magnetic resonance angiography (MRA) device, a magnetic resonance imaging (MRI) device, computed tomography (CT) device, an imaging device, or an ultrasonic device), a navigation device, a global positioning system (GPS) receiver, an event data recorder (EDR), a flight data recorder (FDR), an automotive infotainment device, a naval electronic device (e.g., naval navigation device, gyroscope, or compass), an avionic electronic device, a security device, an industrial or consumer robot, and/or the like.

According to various embodiments of the present disclosure, an electronic device may be furniture, part of a building/structure, an electronic board, electronic signature receiving device, a projector, various measuring devices (e.g., water, electricity, gas or electro-magnetic wave measuring devices), and/or the like that include communication functionality.

According to various embodiments of the present disclosure, an electronic device may be any combination of the foregoing devices. In addition, it will be apparent to one having ordinary skill in the art that an electronic device according to various embodiments of the present disclosure is not limited to the foregoing devices.

According to various embodiments of the present disclosure, for example, a device may be an electronic device.

An embodiment of the present disclosure proposes an apparatus and method for selecting a peer discovery resource (PDR) in a device-to-device (D2D) communication system.

An embodiment of the present disclosure proposes an apparatus and method for selecting a PDR thereby increasing discovery performance in a D2D communication system.

An embodiment of the present disclosure proposes an apparatus and method for selecting a PDR thereby minimizing a discovery message collision in a D2D communication system.

An embodiment of the present disclosure proposes an apparatus and method for selecting a PDR thereby minimizing delay in selecting a peer device in a D2D communication system.

An embodiment of the present disclosure proposes an apparatus and method for selecting a PDR thereby preventing unnecessary transmission of a discovery message in a D2D communication system.

An apparatus and method for selecting a PDR which are proposed in an embodiment of the present disclosure are applicable to all devices which may perform a D2D communication.

Figure 2:
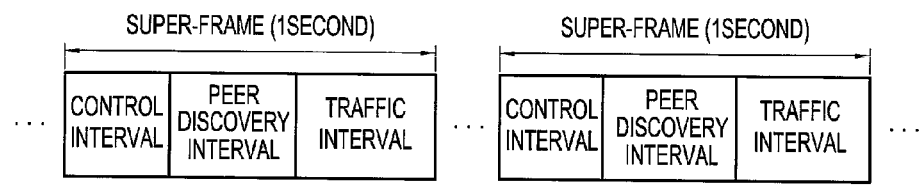
FIG. 2 schematically illustrates a super-frame structure in a D2D communication system according to an embodiment of the present disclosure.

FIG. 2 schematically illustrates a super-frame structure in a D2D communication system according to an embodiment of the present disclosure.

Referring to FIG. 2, the super-frame structure in the D2D communication system is a structure in which a super-frame is repeated by a preset period, e.g., 1 second. Here, one super-frame includes a control interval, a peer discovery interval, and a traffic interval, and each of the control interval, the peer discovery interval, and the traffic interval will be described below.

Firstly, the control interval will be described below.

In the control interval, a time and frequency synchronizing operation, a channel measurement information feedback operation which is required for a D2D communication, and the like between devices are performed using a global positioning system (GPS), and the like.

Secondly, the peer discovery interval will be described below.

In the peer discovery interval, a device broadcasts a discovery message including unique information of the device through a specific PDR and performs a device discovery operation by receiving discovery messages which are transmitted from neighbor devices through PDRs which are different from the specific PDR at the same time.

Thirdly, the traffic interval will be described below.

In the traffic interval, two devices which are formed as peers establish a direct communication link each other, and transmits and receives data through the established communication link.

In FIG. 2, it will be assumed that the peer discovery interval includes a plurality of PDRs which are divided based on an orthogonal frequency division multiplexing (OFDM) scheme. Further, a peer discovery interval may be defined as a set of peer discovery intervals included in $N_{SF}$ super-frames. A peer discovery period in a D2D communication system according to an embodiment of the present disclosure will be described with reference to FIG. 3.

Figure 3:
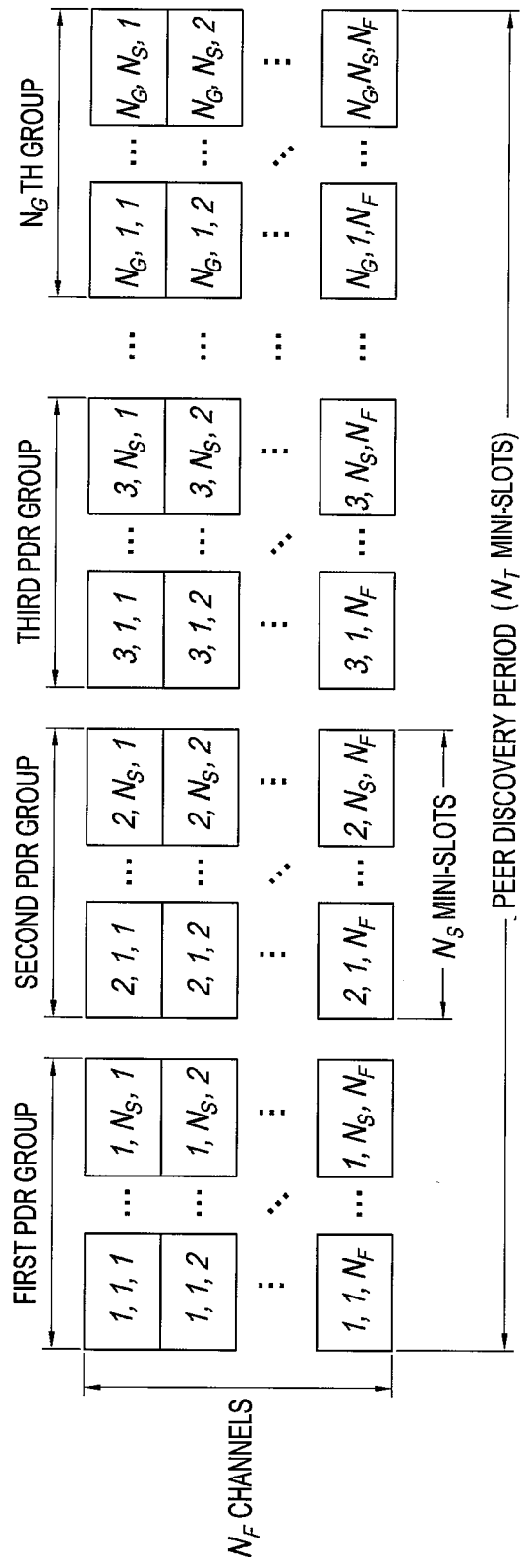
FIG. 3 schematically illustrates a peer discovery period in a D2D communication system according to an embodiment of the present disclosure.

FIG. 3 schematically illustrates a peer discovery period in a D2D communication system according to an embodiment of the present disclosure.

Referring to FIG. 3, the peer discovery period includes $N_T \times N_F$ PDRs which are occupied by $N_T$ mini-slots on a time axis and $N_F$ channels on a frequency axis. The PDRs included in the peer discovery period are divided into $N_G$ PDR groups, and each of the $N_G$ PDR groups is divided into $N_S$ mini-slots and $N_F$ channels. That is, one PDR group includes $N_S \times N_F$ PDRs.

A peer discovery period in a D2D communication system according to an embodiment of the present disclosure has been described with reference to FIG. 3, and a process for allocating a PDR group for devices in a base station in a D2D communication system according to an embodiment of the present disclosure will be described with reference to FIG. 4.

Figure 4:
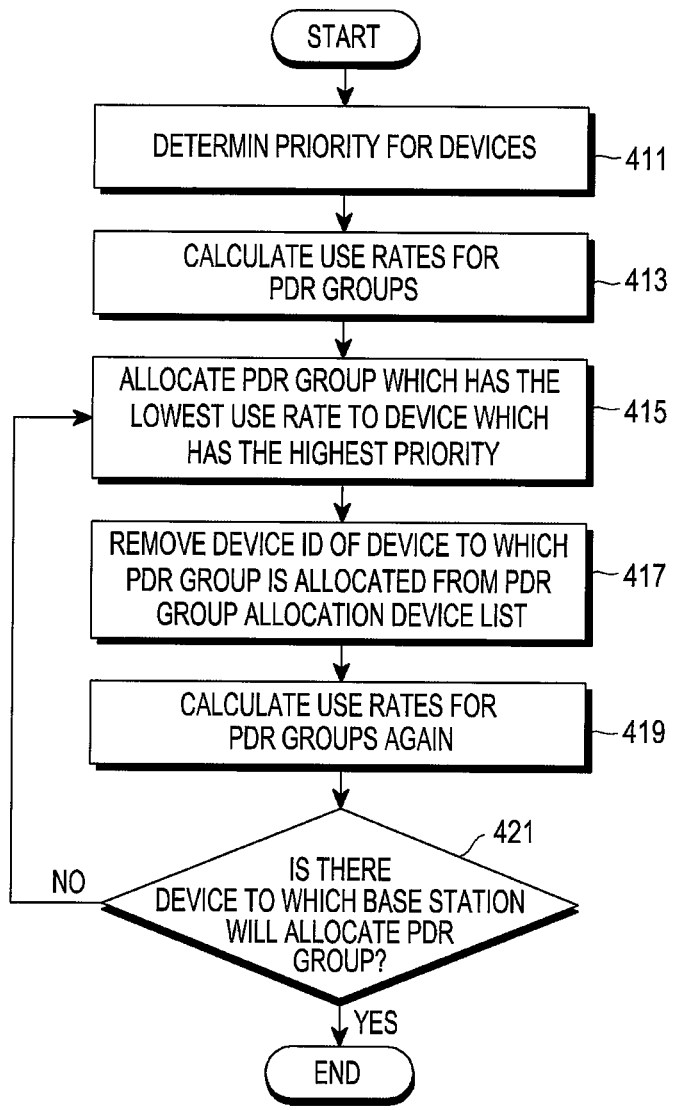
FIG. 4 schematically illustrates a process for allocating a PDR group for devices in a base station in a D2D communication system according to an embodiment of the present disclosure.

FIG. 4 schematically illustrates a process for allocating a PDR group for devices in a base station in a D2D communication system according to an embodiment of the present disclosure.

Referring to FIG. 4, each device performs a time and frequency synchronizing operation with neighbor devices in a control interval included in a super-frame which is firstly started after each device accesses the D2D communication system, and determines a unique group number of the device. Here, the device may determine the unique group number of the device using a device identifier (ID) of the device, may randomly determine the unique group number of the device, or may determine the unique group number of the device using a group number which is allocated by a base station.

Schemes for determining the unique group number of the device in the device will be described below.

Firstly, a scheme for determining the unique group number using the device ID of the device in the device will be described below.

For example, if the device ID is implemented in the form of decimal number, the device selects one PDR group among $N_G$ PDR groups, i.e., groups from the first PDR group to the $N_G$th PDR groups by adding a preset value, e.g., 1 to a remainder value which is generated by dividing the number of PDR groups $N_G$ into the device ID of the device. A group number of the selected PDR group becomes the unique group number of the device.

Secondly, the scheme for randomly determining the unique group number of the device in the device will be described below.

The device selects one of groups from the first PDR group to the $N_G$th PDR group with equal probability, and a group number of the selected PDR group becomes the unique group number of the device.

Thirdly, the scheme for determining the unique group number of the device using the group number which is allocated by the base station in the device will be described below.

The base station selects a PDR group for a related device based on a priority of each of devices and the number of PDR resources which are used in each of the first PDR group to the $N_G$th PDR group, and transmits a group number of the selected PDR group to the related device. The related device determines the group number which is received from the base station as a unique group number of the device.

Here, a process for allocating a PDR group for devices in a base station will be described below with reference to FIG. 4.

Referring to FIG. 4, the base station determines priorities for devices to which the base station intends to allocate PDR groups, i.e., devices which correspond to device IDs included in a PDR group allocation device list at operation 411, and proceeds to operation 413. Here, the base station may determine the priorities for the related devices using various schemes, e.g., by considering a situation or channel status of the devices, and this will be described below.

Firstly, a base station may allocate the highest priority to a device which is in a disaster situation, or which is located at a shadow area thereby being difficult to communicate. Alternatively, the base station may allocate the lowest priority to a device of which a communication environment with the base station is good and uses an application with a low need for a communication between devices. A detailed description of schemes for determining a priority for devices in the base station will be omitted herein.

The base station calculates a use rate for each of all PDR groups which are usable in the base station at operation 413, and proceeds to operation 415. The base station may acquire the number of devices which use PDR resources included in a related PDR group per PDR group by listening discovery messages which are received from devices through a discovery interval, so the base station may calculate a use rate of the related PDR group. There may be various schemes for calculating the use rate of the PDR group, and a detailed description of the schemes for calculating the use rate of the PDR group will be omitted herein.

The base station allocates a PDR group which has the lowest use rate to a device which has the highest priority based on priorities which are allocated to the devices and a use rate of each of the detected PDR groups at operation 415, and proceeds to operation 417.

The base station removes a device ID of the device to which the PDR group is allocated from the PDR group allocation device list at operation 417, and proceeds to operation 419. The base station calculates a use rate of each of the PDR groups again at operation 419, and proceeds to operation 421. The base station determines whether there is a device to which the base station will allocate the PDR group at operation 421. Here, the base station may determine whether there is the device to which the base station will allocate the PDR group based on whether there is a device ID in the PDR group allocation device list.

If there is the device to which the base station will allocate the PDR group, the base station returns to operation 415. Alternatively, if there is no device to which the base station will allocate the PDR group, the base station terminates the process.

Although FIG. 4 illustrates a process for allocating a PDR group for devices in a base station in a D2D communication system according to an embodiment of the present disclosure, various changes could be made to FIG. 4. For example, although shown as a series of operations, various operations in FIG. 4 could overlap, occur in parallel, occur in a different order, or occur multiple times.

A process for allocating a PDR group for devices in a base station in a D2D communication system according to an embodiment of the present disclosure has been described with reference to FIG. 4, and a timing point at which a peer discovery period of each device is started in a D2D communication system according to an embodiment of the present disclosure will be described with reference to FIG. 5.

Figure 5:
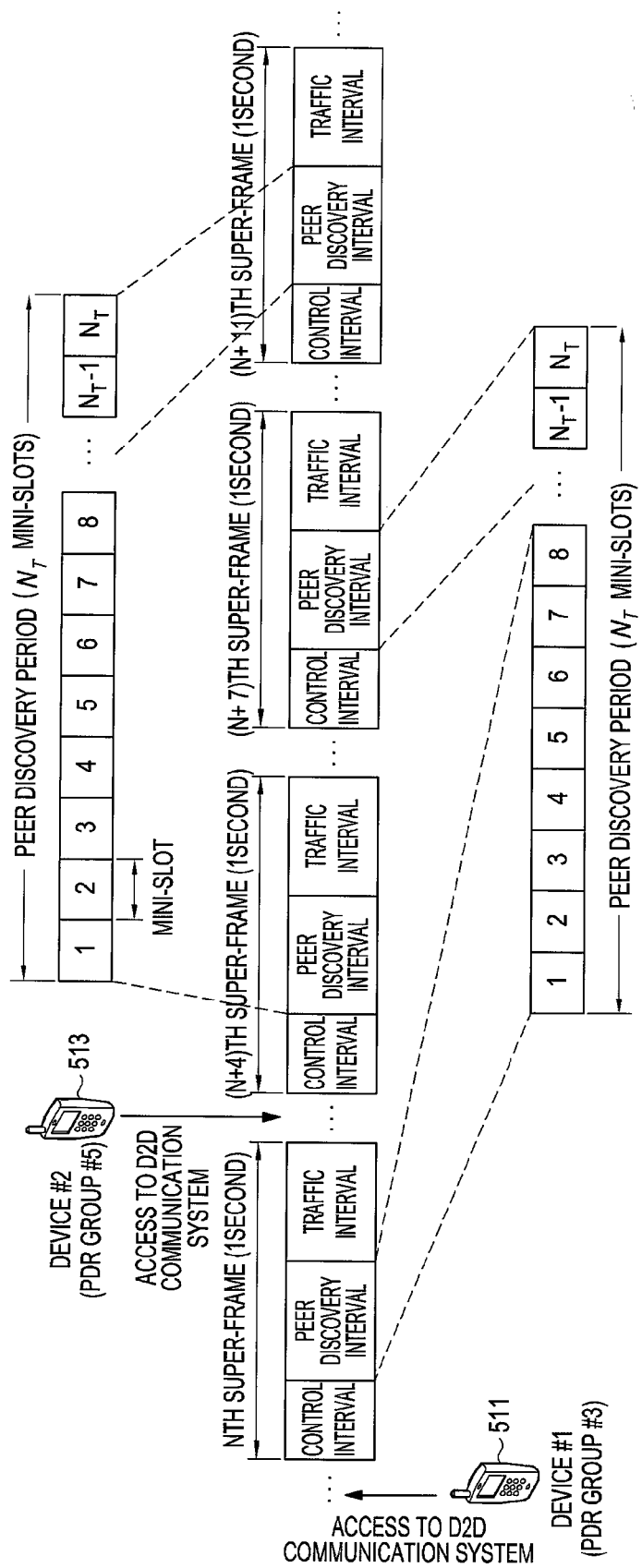
FIG. 5 schematically illustrates a timing point at which a peer discovery period of each device is started in a D2D communication system according to an embodiment of the present disclosure.

FIG. 5 schematically illustrates a timing point at which a peer discovery period of each device is started in a D2D communication system according to an embodiment of the present disclosure.

Referring to FIG. 5, a device which selects a PDR group starts a peer discovery period of the device from a peer discovery interval included in a related super-frame.

In FIG. 5, a device #1 511 and a device #2 513 start a peer discovery period in a peer discovery interval included in a super-frame which is firstly started after a timing point at which the device #1 511 and the device #2 513 access the D2D communication system. In this case, a start timing point and a termination timing point of a peer discovery period may be different per device, so there is no need for synchronizing a peer discovery period between devices, and this does not occur overhead and delay due to an operation for synchronizing a peer discovery period. So, an embodiment of the present disclosure proposes a scheme for preventing a case that the same PDR is selected by a plurality of devices by restricting a PDR selecting range for each device to a PDR group unit.

As illustrated in FIG. 5, if 8 peer discovery intervals are included in one peer discovery period, and one peer discovery interval is included in one PDR selection group, the device #1 511 which selects a PDR group 3 monitors PDRs included in the nth peer discovery interval to the (n+7)th peer discovery interval, and selects a PDR included in the PDR group (a PDR group included in the (n+10)th peer discovery interval) which is selected by the device #1 511 in the next peer discovery period based on the monitored result to use the selected PDR.

Further, the device #2 513 which selects a PDR group 5 monitors PDRs included in the (n+4)th peer discovery interval to the (n+11)th peer discovery interval, and selects a PDR included in a unique PDR group (a PDR group included in the (n+16)th peer discovery interval) of the device #2 513 from the next peer discovery period based on the monitored result to use the selected PDR.

Further, as proposed in an embodiment of the present disclosure, even though a PDR selecting range is restricted to a PDR group unit, the PDR selecting range may maintain compatibility with a PDR selecting scheme which is used in a conventional D2D communication system, i.e., a scheme for randomly selecting a PDR or a scheme for selecting a PDR based on an energy level, and this will be described below.

Firstly, if a scheme for randomly selecting a PDR which is used in a conventional D2D communication system is applied to a scheme for restricting a PDR selecting range which is proposed in an embodiment of the present disclosure, a device may decrease a probability that a discovery message collision occurs compared to the scheme for randomly selecting the PDR which is used in the conventional D2D communication system by randomly selecting a PDR within a unique group of the device.

Secondly, if a scheme for selecting a PDR based on an energy level which is used in a conventional D2D communication system is applied to a scheme for restricting a PDR selecting range which is proposed in an embodiment of the present disclosure, a device may decrease a probability that a discovery message collision occurs compared to the scheme for selecting the PDR based on the energy level which is used in the conventional D2D communication system by selecting a PDR based on an energy level within a unique group of the device.

Meanwhile, a base station may support fast discovery for devices which have a high priority by detecting unused PDRs or reserving a specific dedicated PDR. Further, the base station may support effective PDR selection in devices by controlling devices which are geographically located relatively apart from each other to use the same PDR by considering adjacency between devices, e.g., geographical adjacency between devices.

Meanwhile, in a scheme for restricting a PDR selecting range which is proposed in an embodiment of the present disclosure, a PDR selecting range of a device may be set to a PDR group which is initially determined for the device. If a specific PDR group is used by more devices compared to other PDR groups, a probability that devices which use resources included in the specific PDR group may select the same PDR becomes increased compared to devices which use resources included in the other PDR groups, so discovery performance may be decreased. Alternatively, there are a plurality of PDRs which are unoccupied, i.e., a plurality of unused PDR in a PDR group which is used by relatively less devices, so PDR use efficiency may be decreased in view of the D2D communication system.

So, an embodiment of the present disclosure proposes a method for distributing congestion which is concentrated on a specific PDR group in order to increase all of discovery performance and PDR use efficiency, that is, concentrated use of a PDR resource included in the specific PDR group, and this will be described with reference to FIGS. 6 and 7.

An example of a process for extending a PDR selecting range according to an occurrence of PDR duplicated selection in a D2D communication system according to an embodiment of the present disclosure will be described with reference to FIG. 6.

Figure 6:
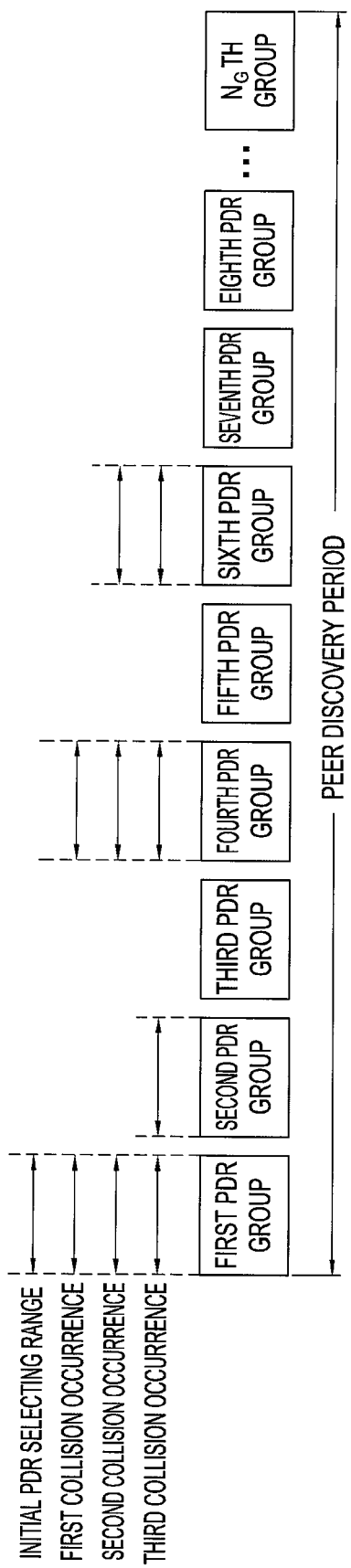
FIG. 6 schematically illustrates an example of a process for extending a PDR selecting range according to an occurrence of PDR duplicated selection in a D2D communication system according to an embodiment of the present disclosure.

FIG. 6 schematically illustrates an example of a process for extending a PDR selecting range according to an occurrence of PDR duplicated selection in a D2D communication system according to an embodiment of the present disclosure.

Referring to FIG. 6, a device which detects PDR duplicated selection extends a PDR selectable range for selecting a new PDR in the next peer discovery period. There may be schemes for extending the PDR selectable range. For example, a device may extend a PDR selectable range thereby the PDR selectable range further includes n PDR groups which are randomly selected whenever the device detects PDR duplicated selection. A process for extending the PDR selectable range thereby the PDR selectable range further includes n PDR groups, e.g., one PDR group which is randomly selected is illustrated in FIG. 6.

As described in FIG. 6, upon detecting duplication selection for a related PDR, a device which initially uses the related PDR among PDRs included in the first PDR group selects one among the PDRs included in the first PDR group and PDRs included in the fourth PDR group which is randomly selected from among the second PDR group to the eighth PDR group. In FIG. 6, the device includes the sixth PDR group and the second PDR group into a PDR selectable range of the device in order according that PDR duplicated selection continuously occurs.

An example of a process for extending a PDR selecting range according to an occurrence of PDR duplicated selection in a D2D communication system according to an embodiment of the present disclosure has been described with reference to FIG. 6, and another example of a process for extending a PDR selecting range according to an occurrence of PDR duplicated selection in a D2D communication system according to an embodiment of the present disclosure will be described with reference to FIG. 7.

Figure 7:
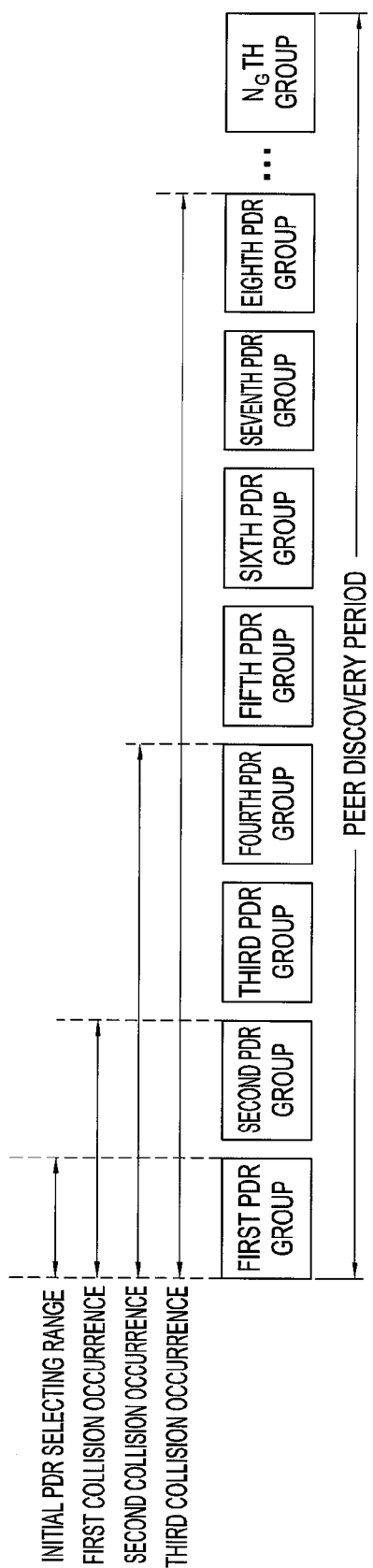
FIG. 7 schematically illustrates another example of a process for extending a PDR selecting range according to an occurrence of PDR duplicated selection in a D2D communication system according to an embodiment of the present disclosure.

FIG. 7 schematically illustrates another example of a process for extending a PDR selecting range according to an occurrence of PDR duplicated selection in a D2D communication system according to an embodiment of the present disclosure.

Referring to FIG. 7, a device which detects PDR duplicated selection extends a PDR selectable range for selecting a new PDR in the next peer discovery period. There may be schemes for extending the PDR selectable range. For example, a device may extend a PDR selectable range x times whenever the device detects PDR duplicated selection. A process for extending the PDR selectable range x (=2) times is illustrated in FIG. 7.

As described in FIG. 7, a device firstly selects a PDR included in the first PDR group, extends a PDR selectable range of the device from the first PDR group to the second PDR group upon detecting duplicated selection of the PDR, and extends the PDR selectable range of the device two times, i.e., from the first PDR group to the fourth PDR group upon detecting duplicated selection of the PDR again.

If a PDR group which is allocated to a device which performs PDR reselection includes total PDRs included in a peer discovery period, PDR group extension is terminated.

If PDR duplicated selection does not occur during m peer discovery periods, a device initializes a PDR group range of the device.

Another example of a process for extending a PDR selecting range according to an occurrence of PDR duplicated selection in a D2D communication system according to an embodiment of the present disclosure has been described with reference to FIG. 7, and a process for suspending PDR selection in a D2D communication system according to an embodiment of the present disclosure will be described with reference to FIG. 8.

Figure 8:
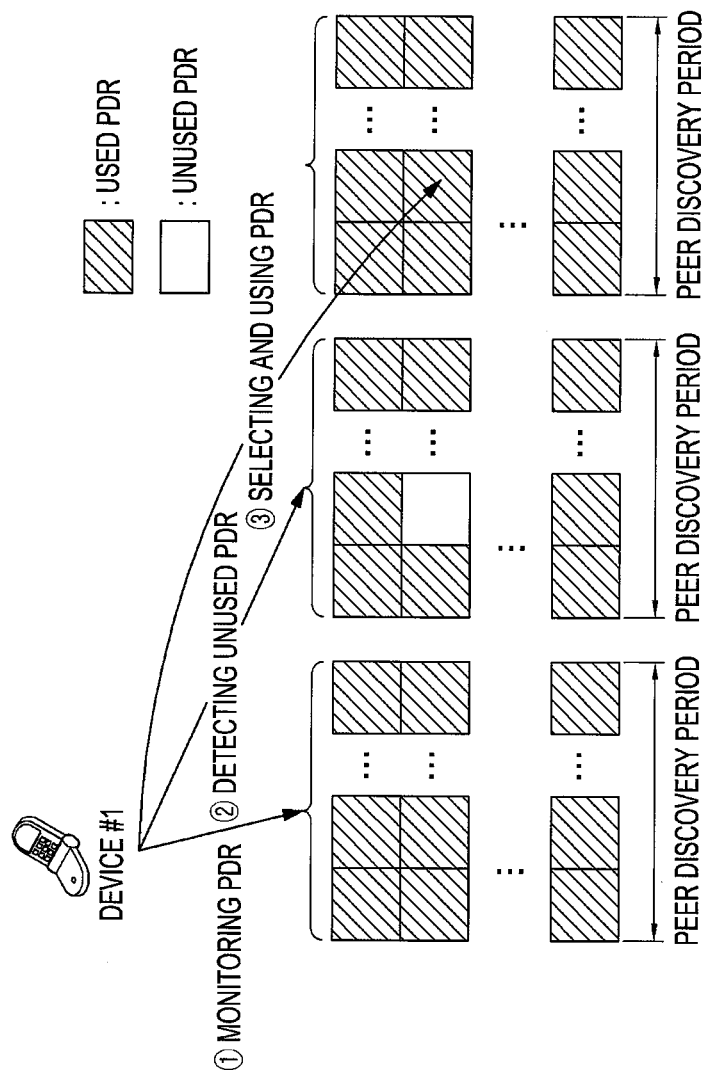
FIG. 8 schematically illustrates a process for suspending PDR selection in a D2D communication system according to an embodiment of the present disclosure.

FIG. 8 schematically illustrates a process for suspending PDR selection in a D2D communication system according to an embodiment of the present disclosure.

Referring to FIG. 8, if a device which needs to select a PDR selects a PDR without considering used PDR among PDRs which are usable in the device, a probability that PDR duplicated selection will occur becomes increased, this will degrade discovery performance. So, an embodiment of the present disclosure proposes a PDR selection suspending scheme thereby suspending PDR selection.

A PDR selection suspending scheme proposed in an embodiment of the present disclosure does not an used PDR by considering whether PDRs which are usable in a device are used already in a case that the device selects a PDR. So, a device which needs to selects a PDR detects which PDRs among PDRs which are usable in the device are used already based on an energy level which is measured for the PDRs which are usable in the device or whether a discovery message for the PDRs which are usable in the device is decoded. In a case that the device detects whether related PDRs are used already based on an energy level, for example, the device may determine a PDR which has an energy level which is equal to or less than a preset threshold energy level as an unused PDR. Alternatively, in a case that the device detects whether PDRs are used already based on whether a discovery message is decoded, for example, the device may determine a specific PDR through which a discovery message is received as an unused PDR if the device is impossible to decode the discovery message.

Meanwhile, the device selects one from among PDRs included in the peer discovery period except PDRs which are used already as a PDR which the device will use. If it is detected that all PDRs included in the peer discovery period are used already, the device does not select any one from among the PDRs included in the peer discovery period, and repetitively performs a monitoring operation for all PDRs every peer discovery period until detecting unused PDRs as illustrated in FIG. 8. Upon detecting unused PDRs on a specific peer discovery period, the device transmits a discovery message through one of the unused PDRs from the next peer discovery period.

A process for suspending PDR selection in a D2D communication system according to an embodiment of the present disclosure has been described with reference to FIG. 8, and a process for transmitting a discovery message in a device in a D2D communication system according to an embodiment of the present disclosure will be described with reference to FIG. 9.

Figure 9:
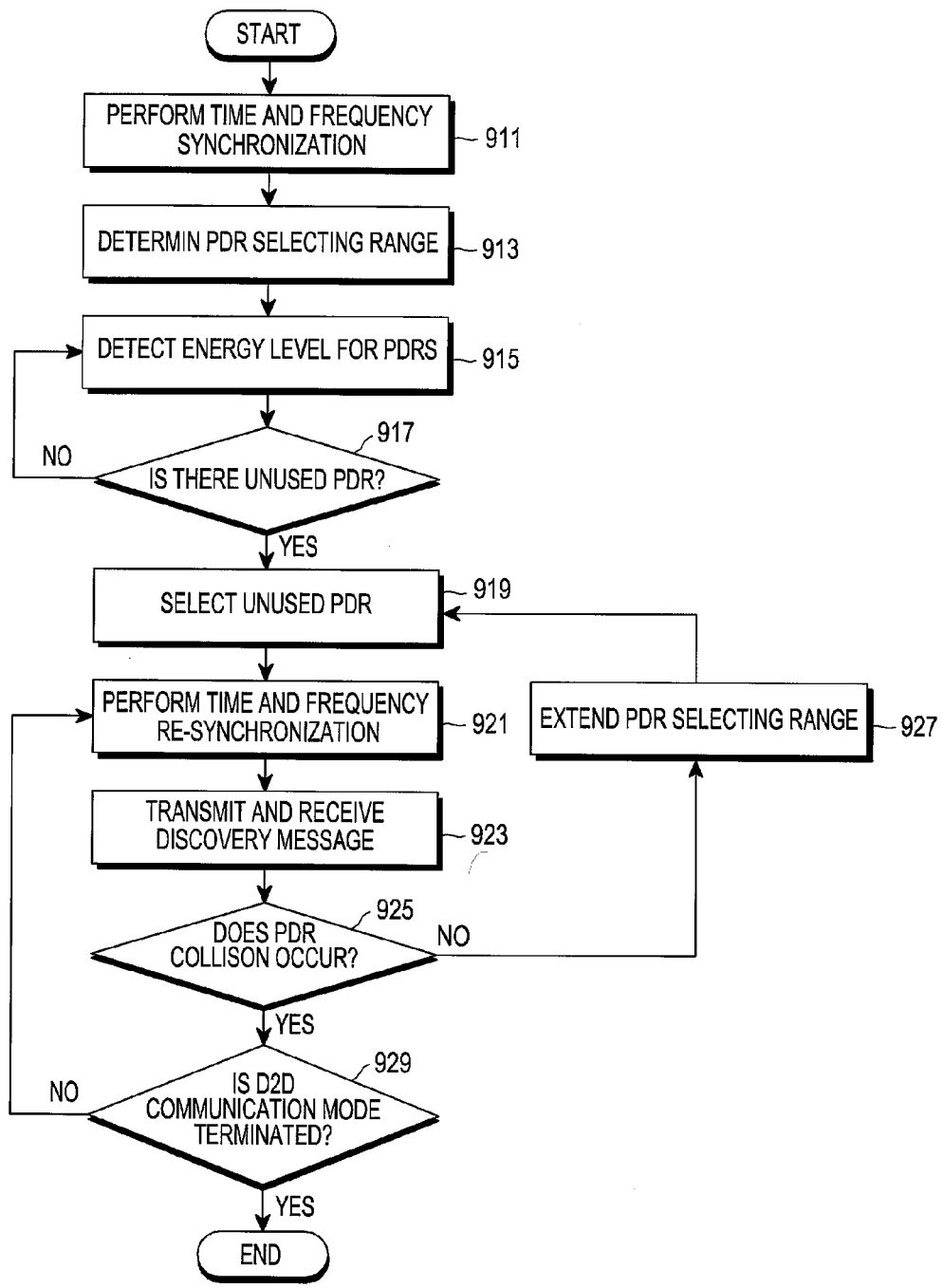
FIG. 9 schematically illustrates a process for transmitting a discovery message in a device in a D2D communication system according to an embodiment of the present disclosure.

FIG. 9 schematically illustrates a process for transmitting a discovery message in a device in a D2D communication system according to an embodiment of the present disclosure.

Referring to FIG. 9, the device performs time and frequency synchronization with neighbor devices in a control interval included in a super-frame which is firstly started after accessing the D2D communication system at operation 911, and proceeds to operation 913. The device determines a PDR selection range of the device as a group unit at operation 913, and proceeds to operation 915.

The device detects energy levels for all PDRs included in a peer discovery interval included in every super-frame at operation 915, and proceeds to operation 917. The device determines whether there is an unused PDR based on the detected energy levels at operation 917. If there is no unused PDR, the devices returns to operation 915 to detect an energy level for PDRs in every peer discovery period until detecting the unused PDR.

If there is the unused PDR at operation 917, the device proceeds to operation 919. The device selects one of the unused PDRs at operation 919, and proceeds to operation 921. The device performs time and frequency re-synchronization with neighbor devices in a control interval included in a related super-frame corresponding to the selected unused PDR at operation 921, and proceeds to operation 923.

The device transmits and receives a discovery message using the selected PDR at operation 923, and proceeds to operation 925. The device determines whether PDR duplicated selection for the PDR which is selected by the device occurs while transmitting and receiving the discovery message using the selected PDR, that is, whether a PDR collision occurs at operation 925. If the PDR duplicated selection for the selected PDR occurs, the device proceeds to operation 927. The device extends a PDR selecting range of the device, and returns to operation 919.

If the PDR duplicated selection for the selected PDR does not occur, the device proceeds to operation 929. The device determines whether a D2D communication mode is terminated at operation 929. If the D2D communication mode is not terminated, the device returns to operation 921. Alternatively, if the D2D communication mode is terminated, the device terminates the process.

Although FIG. 9 illustrates a process for transmitting a discovery message in a device in a D2D communication system according to an embodiment of the present disclosure, various changes could be made to FIG. 9. For example, although shown as a series of operations, various operations in FIG. 9 could overlap, occur in parallel, occur in a different order, or occur multiple times.

A process for transmitting a discovery message in a device in a D2D communication system according to an embodiment of the present disclosure has been described with reference to FIG. 9, and a process for receiving a discovery message in a device in a D2D communication system according to an embodiment of the present disclosure will be described with reference to FIG. 10.

Figure 10:
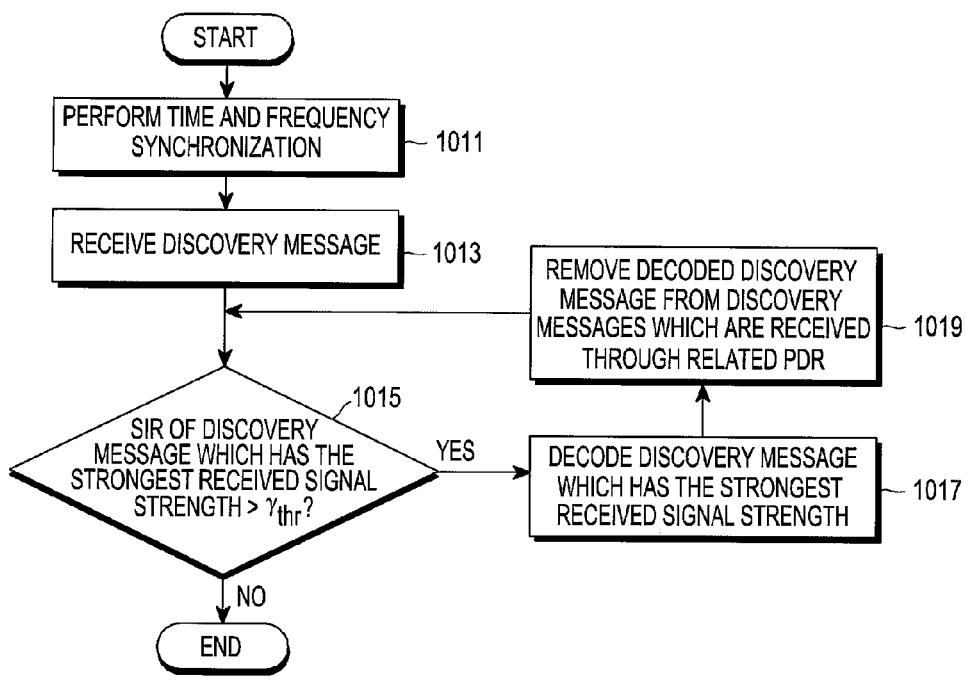
FIG. 10 schematically illustrates a process for receiving a discovery message in a device in a D2D communication system according to an embodiment of the present disclosure.

FIG. 10 schematically illustrates a process for receiving a discovery message in a device in a D2D communication system according to an embodiment of the present disclosure.

Referring to FIG. 10, the device performs time and frequency synchronization with neighbor devices in a control interval included in a super-frame which is firstly started after accessing the D2D communication system at operation 1011, and proceeds to operation 1013. The device receives a discovery message which is transmitted in neighbor devices per PDR in a peer discovery interval included in the super-frame at operation 1013, and proceeds to operation 1015.

The device performs a decoding operation for the received discovery message at operation 1015. Here, each PDR may be reused, so a discovery message which is received through one PDR may be a discovery message in which one or more than one discovery messages are overlapped. So, the device uses a Successive Interference Cancellation (SIC) scheme for discovery message decoding. Here, the device measures a Signal-to-Interference Ratio (SIR) of a discovery message which has the strongest received signal strength among discovery messages which are received through each PDR. So, the device determines whether the SIR of the discovery message which has the strongest received signal strength among the discovery message which are received through each PDR is greater than a preset minimum required SIR $\gamma_{thr}$ at operation 1015.

If the SIR of the discovery message which has the strongest received signal strength among the discovery message which are received through each PDR is not greater than the preset minimum required SIR $\gamma_{thr}$, that is, if the SIR of the discovery message which has the strongest received signal strength among the discovery message which are received through each PDR is equal to or less than the preset minimum required SIR $\gamma_{thr}$, the device terminates the process.

If the SIR of the discovery message which has the strongest received signal strength among the discovery message which are received through each PDR is greater than the preset minimum required SIR $\gamma_{thr}$, the device proceeds to operation 1017. The device decodes the discovery message which has the strongest received signal strength among the discovery message which are received through each PDR at operation 1017, and proceeds to operation 1019. Here, a fact that the discovery message may be decoded indicates that there is a neighbor device which uses a related PDR. The device removes the decoded discovery message from the discovery messages which are received through the related PDR at operation 1019, and returns to operation 1015 to repeat operations 1015 to 1019 for the remaining discovery messages.

Although FIG. 10 illustrates a process for receiving a discovery message in a device in a D2D communication system according to an embodiment of the present disclosure, various changes could be made to FIG. 10. For example, although shown as a series of operations, various operations in FIG. 10 could overlap, occur in parallel, occur in a different order, or occur multiple times.

A process for receiving a discovery message in a device in a D2D communication system according to an embodiment of the present disclosure has been described with reference to FIG. 10, and discovery performance of a PDR selecting scheme according to embodiments of the present disclosure in a D2D communication system will be described with reference to FIGS. 11 to 16.

Prior to a description of FIGS. 11 to 16, it will be assumed that discovery performance of a PDR selecting scheme according to embodiments of the present disclosure is simulated by assuming the following criteria.

(1) The D2D communication system simulates discovery performance of a PDR selecting scheme according to embodiments of the present disclosure using an SIC scheme.

(2) In a related discovery performance simulation, a network environment which is composed of 19 areas with a hexagon shape which has an inscribed circle radius of 500 meters is assumed, and it will be assumed that $N_D$(=3000, 3500, 4000) devices exist in each of the 19 areas. Further, it will be assumed that a device which is located at an area which is deployed at a center among the 19 areas performs a discovery operation for devices within one area around a location of the device, and detects that discovery for a related device is successful if a signal to interference plus noise ratio (SINR) of the detected discovery message is equal to or greater than a minimum SINR 4.5 dB at which decoding is possible.

(3) Specially, it will be assumed that a device may perform infinitely and repetitively an SIC operation for discovery message which are received through one PDR using an SIC receiver which may use an unlimited number of SIC codes. If an SINR of a discovery message which is transmitted in a specific device is equal to or greater than 4.5 dBm, the SIC receiver removes the discovery message of the specific device from total discovery messages after decoding the discovery message of the specific device. So, the device may perform a discovery operation for a plurality of devices at the same PDR at the same time by repetitively performing this operation for the remaining discovery messages.

(4) It will be assumed that one peer discovery interval includes 3584 PDRs, and are divides 8 PDR groups including the same number of PDRs, e.g., 448 PDRs.

(5) A base station supports determination of a PDR group which will be used in a device. It will be assumed that a device extends a PDR selecting range of the device two times based on a selected PDR group if a PDR collision occurs.

(6) It will be assumed that a channel between devices uses an additive white Gaussian noise (AWGN) channel model which is based on a model which is inversely proportional to four square of a distance between the devices.

(7) An environment will be assumed that a random waypoint model is used as a device mobility model and all devices move according to a pedestrian model or a vehicle model. Here, it will be assumed that devices determine a speed according to truncated normal distribution with average 3 km/h, standard deviation 0.3 km/h, and a minimum 0 km/h in a pedestrian model, and determine a speed according to truncated normal distribution with average 30 km/h, standard deviation 3 km/h, and a minimum 0 km/h in a vehicle model. Further, it will be assumed that the devices determine a moving direction with an equal probability within 0 to 360 degrees, and newly determine a speed and a direction with a 0.2 probability every 8 seconds.

Discovery performance of a PDR selecting scheme according to embodiments of the present disclosure in a case that a D2D communication system is implemented based on a pedestrian mobility model will be described with reference to FIG. 11.

Figure 11:
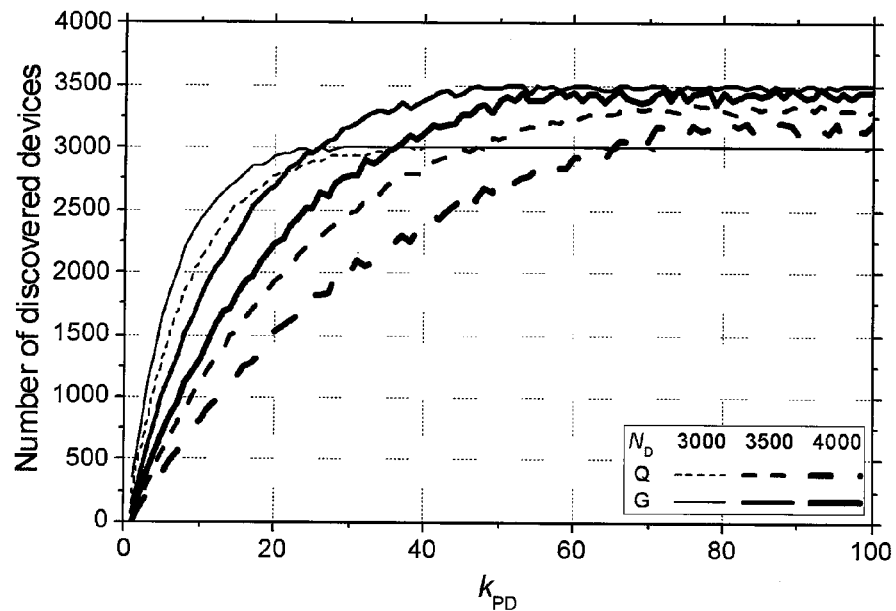
FIG. 11 schematically illustrates a simulation graph illustrating discovery performance of a PDR selecting scheme according to embodiments of the present disclosure based on the number of devices which are successful in discovery in a case that a D2D communication system is implemented based on a pedestrian mobility model.

FIG. 11 schematically illustrates a simulation graph illustrating discovery performance of a PDR selecting scheme according to embodiments of the present disclosure based on the number of devices which are successful in discovery in a case that a D2D communication system is implemented based on a pedestrian mobility model.

A simulation graph illustrated in FIG. 11 indicates the number of devices that a specific device is successful in discovering every PD repetition period ($k_{PD}$) in a case that $N_D$ devices start using a PDR at the same time in an environment that a pedestrian mobility model is used.

Firstly, in a case that the number of devices which are located at each area is 3000, it will be understood that discovery performance of a PDR selecting scheme of a general D2D communication system is similar to discovery performance of a PDR selecting scheme according to embodiments of the present disclosure. In this case, it will be understood that almost devices which are located at the D2D communication system have been successful in discovering 3000 neighbor devices, and the discovery performance (marked as 'Q' in FIG. 11) of the PDR selecting scheme of the general D2D communication system is almost similar to the discovery performance (marked as 'G' in FIG. 11) of the PDR selecting scheme according to embodiments of the present disclosure. Meanwhile, it will be understood that a PDR selecting scheme according to embodiments of the present disclosure relatively quickly detects neighbor devices compared to a PDR selecting scheme of a general D2D communication system in an initial state of a discovery operation.

Secondly, in a case that the number of devices which are located at each area is 3500 and 4000, it will be understood that a PDR selecting scheme according to embodiments of the present disclosure may discover more number of devices compared to a PDR selecting scheme of a general D2D communication system, and a speed at which neighbor devices are discovered in the PDR selecting scheme according to embodiments of the present disclosure is higher than a speed at which neighbor devices are discovered in the PDR selecting scheme of the general D2D communication system in an initial state of a discovery operation.

Consequentially, this means that a PDR selecting scheme which is based on a PDR group according to embodiments of the present disclosure may relatively quickly perform a discovery operation for a specific device in a wider range compared to a PDR selecting scheme of a general D2D communication system by effectively distributing PDR use contention among devices.

Figure 12:
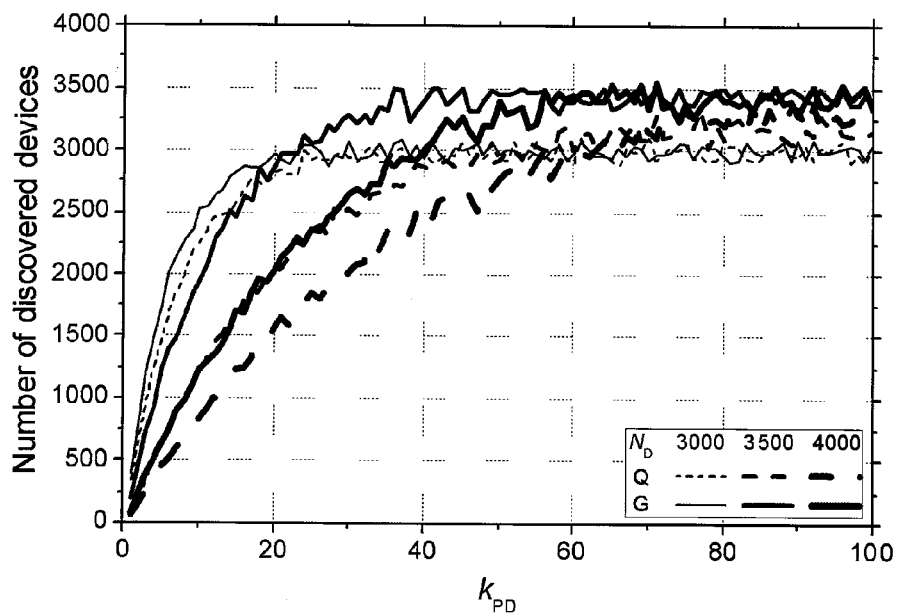
FIG. 12 schematically illustrates a simulation graph illustrating discovery performance of a PDR selecting scheme according to embodiments of the present disclosure based on the number of devices which are successful in discovery in a case that a D2D communication system is implemented based on a vehicle mobility model.

In FIG. 11, discovery performance of a PDR selecting scheme according to embodiments of the present disclosure in a case that a D2D communication system is implemented based on a pedestrian mobility model has been described based on the number of devices which are successful in discovery. In FIG. 12, discovery performance of a PDR selecting scheme according to embodiments of the present disclosure in a case that a D2D communication system is implemented based on a vehicle mobility model will be described based on the number of devices which are successful in discovery.

FIG. 12 schematically illustrates a simulation graph illustrating discovery performance of a PDR selecting scheme according to embodiments of the present disclosure based on the number of devices which are successful in discovery in a case that a D2D communication system is implemented based on a vehicle mobility model.

A simulation graph illustrated in FIG. 12 indicates the number of devices that a specific device is successful in discovering every PD repetition period ($k_{PD}$) in a case that $N_D$ devices start using a PDR at the same time in an environment that a vehicle mobility model is used.

In FIG. 12, in a vehicle mobility model, an average speed of a device is relatively fast, so the number of devices which enter into a discovery area of a device or move out of a discovery area of a device every peer discovery period is large. So, due to this, it will be understood that if the vehicle mobility model is used, deviation for the numbers of devices which are successful in discovery according to a peer discovery repetition period is great compared to a case that a pedestrian mobility model is used.

Further, in a vehicle mobility model, the more number of devices newly enter into a discovery area, so a probability that the devices result in an occurrence of a PDR collision with devices which are located at the discovery area is higher. So, it will be understood that due to this reason, in a vehicle mobility model, the number of devices which are successful in discovery is decreased by about 1% compared to a pedestrian mobility model, and the lower a mobile speed of a device is, the more increased the number of devices which are successful in discovery.

Figure 13:
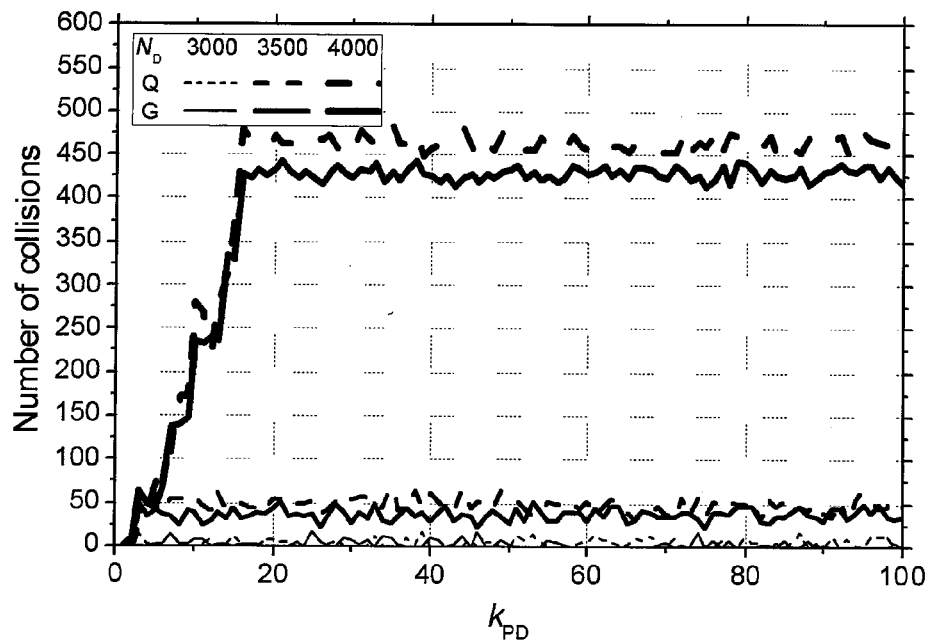
FIG. 13 schematically illustrates a simulation graph illustrating discovery performance of a PDR selecting scheme according to embodiments of the present disclosure based on the number of devices in which PDR collision occurs in a case that a D2D communication system is implemented based on a pedestrian mobility model.

In FIG. 12, discovery performance of a PDR selecting scheme according to embodiments of the present disclosure in a case that a D2D communication system is implemented based on a vehicle mobility model has been described based on the number of devices which are successful in discovery. In FIG. 13, discovery performance of a PDR selecting scheme according to embodiments of the present disclosure in a case that a D2D communication system is implemented based on a pedestrian mobility model will be described based on the number of devices in which PDR collision occurs.

FIG. 13 schematically illustrates a simulation graph illustrating discovery performance of a PDR selecting scheme according to embodiments of the present disclosure based on the number of devices in which PDR collision occurs in a case that a D2D communication system is implemented based on a pedestrian mobility model.

FIG. 13 indicates the number of devices which have been discovered in a specific device in a previous peer discovery period ($k_{PD}$=n−1) and are not discovered in the specific device in a current peer discovery period ($k_{PD}$=n) among $N_D$ devices which start contention for PDR use at the same time in an initial peer discovery period ($k_{PD}$=1).

In FIG. 13, if 3000 devices are located at each area, the number of usable PDRs is less than the number of devices, so one device may averagely use one PDR. So, in a case that a PDR discovery scheme proposed in embodiments of the present disclosure is used, a PDR collision which is almost similar to a PDR discovery scheme of a general D2D communication system may occur, discovery performance of the PDR discovery scheme proposed in embodiments of the present disclosure becomes almost similar to discovery performance of the PDR discovery scheme of the general D2D communication system.

In FIG. 13, alternatively, if 3500 or more than 3500 devices, or 4000 or more than 4000 devices are located at each area, a case that two or more than two devices intend to use one PDR may occur. At this time, it will be understood that in a case that a PDR discovery scheme proposed in embodiments of the present disclosure is used, a PDR collision count may be decreased by about 5~10% compared to a case that a PDR discovery scheme of a general D2D communication system is used.

Figure 14:
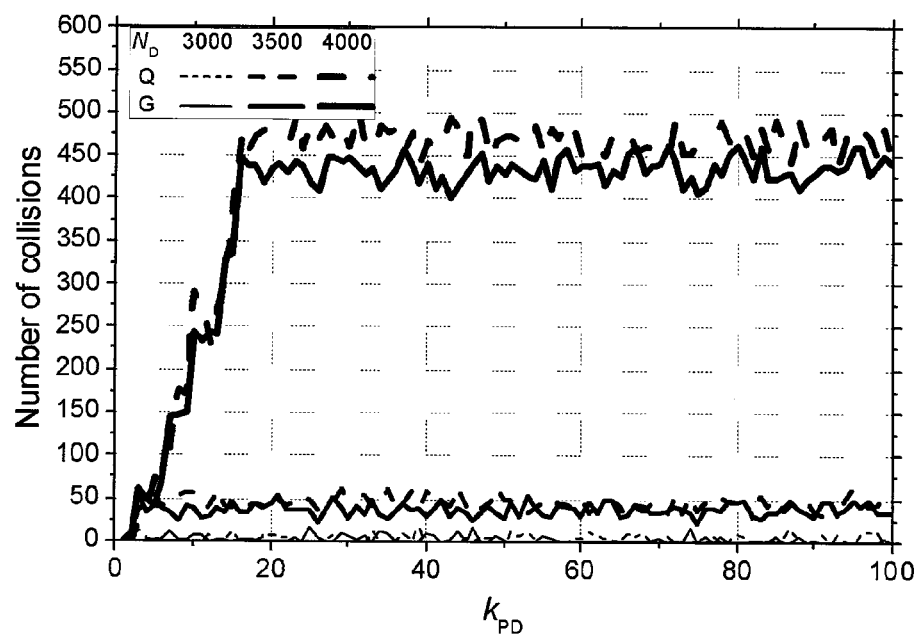
FIG. 14 schematically illustrates a simulation graph illustrating discovery performance of a PDR selecting scheme according to embodiments of the present disclosure based on the number of devices in which PDR collision occurs in a case that a D2D communication system is implemented based on a vehicle mobility model.

In FIG. 13, discovery performance of a PDR selecting scheme according to embodiments of the present disclosure in a case that a D2D communication system is implemented based on a pedestrian mobility model has been described based on the number of devices in which PDR collision occurs. In FIG. 14, discovery performance of a PDR selecting scheme according to embodiments of the present disclosure in a case that a D2D communication system is implemented based on a vehicle mobility model will be described based on the number of devices in which PDR collision occurs.

FIG. 14 schematically illustrates a simulation graph illustrating discovery performance of a PDR selecting scheme according to embodiments of the present disclosure based on the number of devices in which PDR collision occurs in a case that a D2D communication system is implemented based on a vehicle mobility model.

FIG. 14 indicates the number of devices which have been discovered in a specific device in a previous peer discovery period ($k_{PD}$=n−1) and are not discovered in the specific device in a current peer discovery period ($k_m$=n) among $N_D$ devices which start contention for PDR use at the same time in an initial peer discovery period ($k_{PD}$=1).

In FIG. 14, if 3000 devices are located at each area, the number of usable PDRs is less than the number of devices, so one device may averagely use one PDR. So, in a case that a PDR discovery scheme proposed in embodiments of the present disclosure is used, a PDR collision which is almost similar to a PDR discovery scheme of a general D2D communication system may occur, discovery performance of the PDR discovery scheme proposed in embodiments of the present disclosure becomes almost similar to discovery performance of the PDR discovery scheme of the general D2D communication system.

In FIG. 14, alternatively, if 3500 or more than 3500 devices, or 4000 or more than 4000 devices are located at each area, a case that two or more than two devices intend to use one PDR may occur. At this time, it will be understood that in a case that a PDR discovery scheme proposed in embodiments of the present disclosure is used, a PDR collision count may be decreased compared to a case that a PDR discovery scheme of a general D2D communication system is used.

Further, in a case that a D2D communication system is implemented based on a vehicle mobility model, as described in FIG. 13, a PDR collision count may be increased by about 2~3% compared to a case that the D2D communication system is implemented based a pedestrian mobility model even though a PDR selecting scheme according to embodiments of the present disclosure is identically used.

Figure 15:
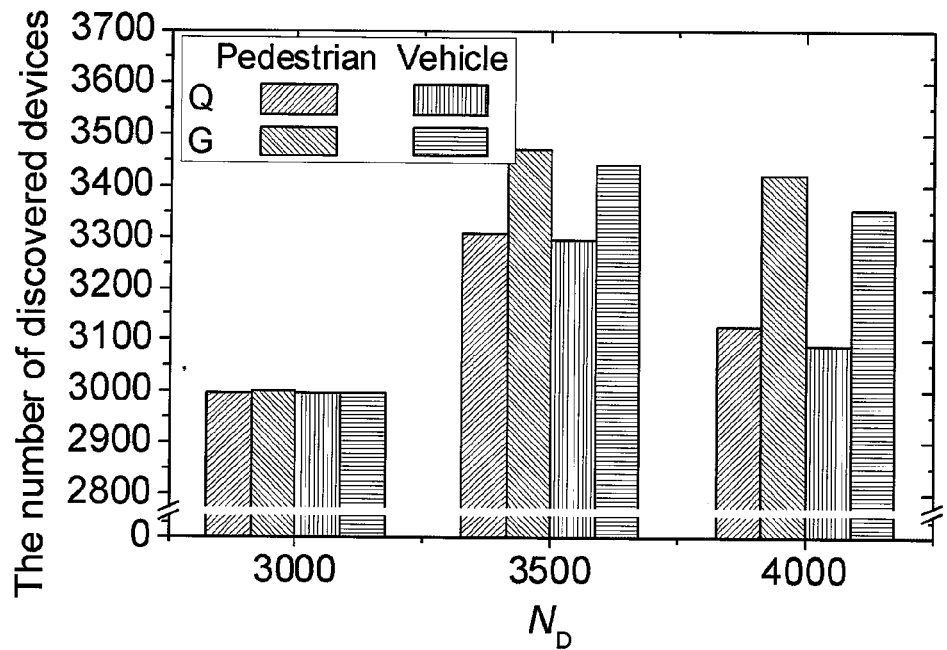
FIG. 15 schematically illustrates a simulation graph illustrating discovery performance of a PDR selecting scheme according to embodiments of the present disclosure based on the number of devices which are successful in discovery in a case that a D2D communication system is implemented based on a pedestrian mobility model.

In FIG. 14, discovery performance of a PDR selecting scheme according to embodiments of the present disclosure in a case that a D2D communication system is implemented based on a vehicle mobility model has been described based on the number of devices in which PDR collision occurs. In FIG. 15, discovery performance of a PDR selecting scheme according to embodiments of the present disclosure in a case that a D2D communication system is implemented based on a pedestrian mobility model will be described based on the number of devices which are successful in discovery.

FIG. 15 schematically illustrates a simulation graph illustrating discovery performance of a PDR selecting scheme according to embodiments of the present disclosure based on the number of devices which are successful in discovery in a case that a D2D communication system is implemented based on a pedestrian mobility model.

In FIG. 15, if 3000 devices are located at each area, the number of the devices is less than the number of PDRs which are usable at a related area, so almost devices are successful in neighbor device discovery. So, a PDR discovery scheme which is proposed in embodiments of the present disclosure may have a probability that neighbor device discovery is successful which is almost similar to a PDR discovery scheme of a general D2D communication system. So, discovery performance of the PDR discovery scheme which is proposed in embodiments of the present disclosure becomes almost similar to discovery performance of the PDR discovery scheme of the general D2D communication system.

In FIG. 15, alternatively, in a case that 3500 or more than 3500 devices, or 4000 or more than 4000 devices are located at each area, if a PDR discovery scheme which is proposed in embodiments of the present disclosure is used, a PDR use contention is distributed, so it will be understood that a probability that neighbor device discovery is successful becomes increased compared to a case that a PDR discovery scheme of a general D2D communication system is used, so discovery performance thereof becomes also increased.

Figure 16:
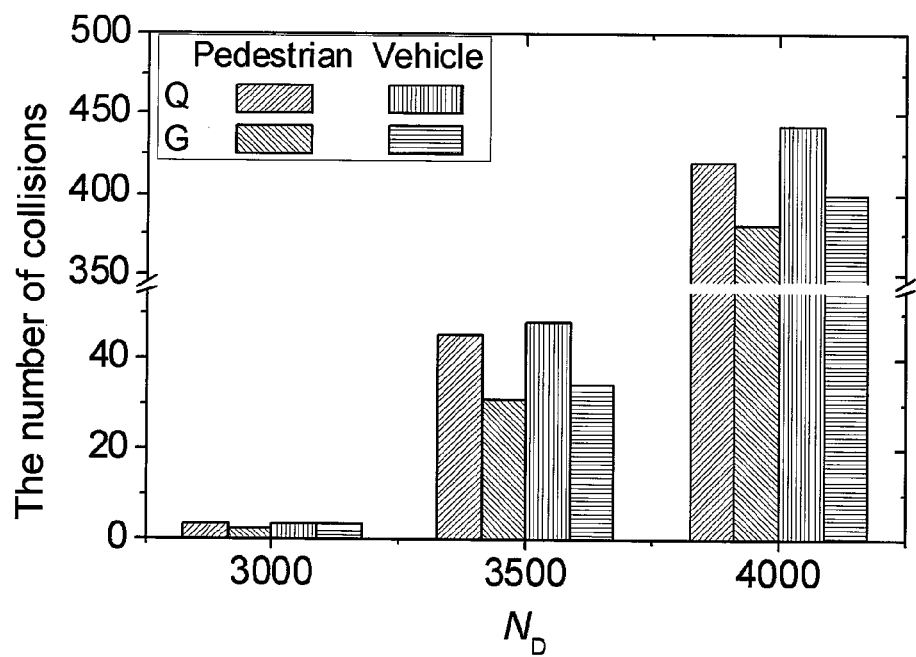
FIG. 16 schematically illustrates a simulation graph illustrating discovery performance of a PDR selecting scheme according to embodiments of the present disclosure based on the number of devices which are successful in discovery in a case that a D2D communication system is implemented based on a vehicle mobility model.

In FIG. 15, discovery performance of a PDR selecting scheme according to embodiments of the present disclosure in a case that a D2D communication system is implemented based on a pedestrian mobility model has been described based on the number of devices which are successful in discovery. In FIG. 16, discovery performance of a PDR selecting scheme according to embodiments of the present disclosure in a case that a D2D communication system is implemented based on a vehicle mobility model will be described based on the number of devices which are successful in discovery.

FIG. 16 schematically illustrates a simulation graph illustrating discovery performance of a PDR selecting scheme according to embodiments of the present disclosure based on the number of devices which are successful in discovery in a case that a D2D communication system is implemented based on a vehicle mobility model.

In FIG. 16, if 3000 devices are located at each area, the number of the devices is less than the number of PDRs which are usable at a related area, so almost devices are successful in neighbor device discovery. So, a PDR discovery scheme which is proposed in embodiments of the present disclosure may have a probability that neighbor device discovery is successful which is almost similar to a PDR discovery scheme of a general D2D communication system. So, discovery performance of the PDR discovery scheme which is proposed in embodiments of the present disclosure becomes almost similar to discovery performance of the PDR discovery scheme of the general D2D communication system.

In FIG. 16, alternatively, in a case that 3500 or more than 3500 devices, or 4000 or more than 4000 devices are located at each area, if a PDR discovery scheme which is proposed in embodiments of the present disclosure is used, a PDR use contention is distributed, so it will be understood that a probability that neighbor device discovery is successful becomes increased compared to a case that a PDR discovery scheme of a general D2D communication system is used, so discovery performance thereof becomes also increased.

Meanwhile, the more increased an average speed of a device is, the more decreased discovery performance of the device is. So, in a case that a D2D communication system is implemented based on a vehicle mobility model, as described in FIG. 15, it will be understood that a probability that neighbor device discovery is successful is decreased by about 1~3% compared to a case that the D2D communication system is implemented based on a pedestrian mobility model even though a PDR selecting scheme according to embodiments of the present disclosure is identically used. This is why the number of devices which move out of a related discovery area or newly access a D2D communication system after succeeding in neighbor device discovery due to a mobility of a device is relatively great.

In FIG. 16, discovery performance of a PDR selecting scheme according to embodiments of the present disclosure in a case that a D2D communication system is implemented based on a vehicle mobility model has been described based on the number of devices which are successful in discovery. An inner structure of a device in a D2D communication system according to an embodiment of the present disclosure will be described with reference to FIG. 17.

Figure 17:
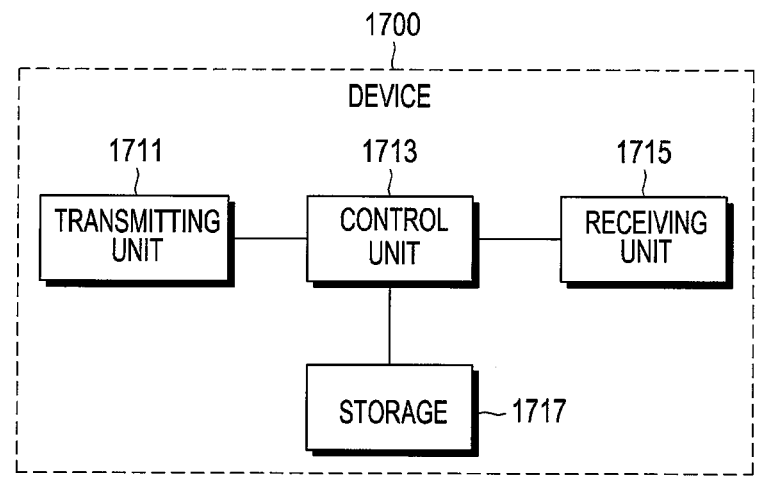
FIG. 17 schematically illustrates an inner structure of a device in a D2D communication system according to an embodiment of the present disclosure.

FIG. 17 schematically illustrates an inner structure of a device in a D2D communication system according to an embodiment of the present disclosure.

Referring to FIG. 17, a device 1700 includes a transmitting unit 1711, a control unit 1713, a receiving unit 1715, and a storage unit 1717.

The control unit 1713 controls the overall operation of the device 1700. More particularly, the control unit 1713 controls the device 1700 to perform an operation for selecting a PDR as described FIGS. 2 to 16. The operation for selecting the PDR is performed in the manner described with reference to FIGS. 2 to 16, and a description thereof will be omitted herein.

The transmitting unit 1711 transmits various messages to other devices, or a base station under a control of the control unit 1713. The various messages transmitted in the transmitting unit 1711 have been described in FIGS. 2 to 16 and a description thereof will be omitted herein.

The receiving unit 1715 receives various messages from other devices or a base station under a control of the control unit 1713. The various messages received in the receiving unit 1715 have been described in FIGS. 2 to 16 and a description thereof will be omitted herein.

The storage unit 1717 stores a program related to the operation for selecting the PDR in the device 1700, various data, and the like. The storage unit 1717 stores the various messages which are received by the receiving unit 1715 from the other devices, or the base station.

While the transmitting unit 1711, the control unit 1713, the receiving unit 1715, and the storage unit 1717 are described in the device 1700 as separate units, it is to be understood that this is merely for convenience of description. In other words, two or more of the transmitting unit 1711, the control unit 1713, the receiving unit 1715, and the storage unit 1717 may be incorporated into a single unit.

An inner structure of a device in a D2D communication system according to an embodiment of the present disclosure has been described with reference to FIG. 17, and an inner structure of a base station in a D2D communication system according to an embodiment of the present disclosure will be described with reference to FIG. 18.

Figure 18:
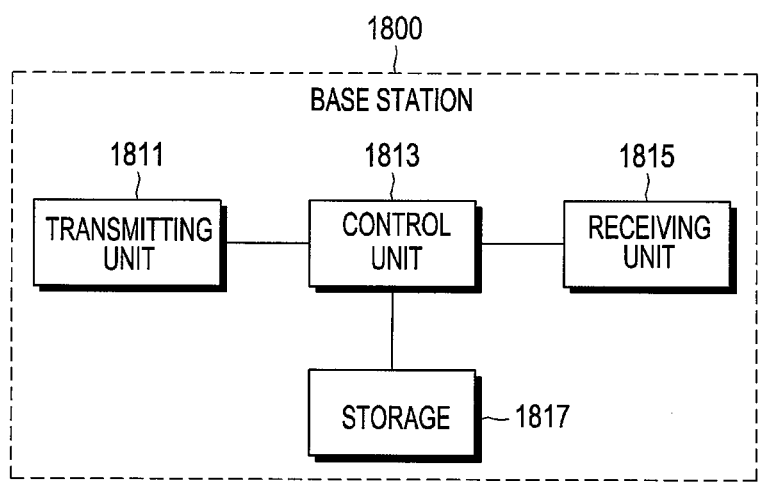
FIG. 18 schematically illustrates an inner structure of a base station in a D2D communication system according to an embodiment of the present disclosure.

FIG. 18 schematically illustrates an inner structure of a base station in a D2D communication system according to an embodiment of the present disclosure.

Referring to FIG. 18, a base station 1800 includes a transmitting unit 1811, a control unit 1813, a receiving unit 1815, and a storage unit 1817.

The control unit 1813 controls the overall operation of the base station 1800. More particularly, the control unit 1813 controls the base station 1800 to perform an operation for controlling a PDR selecting operation for a device as described FIGS. 2 to 16. The operation for controlling the PDR selecting operation for the device is performed in the manner described with reference to FIGS. 2 to 16, and a description thereof will be omitted herein.

The transmitting unit 1811 transmits various messages to devices under a control of the control unit 1813. The various messages transmitted in the transmitting unit 1811 have been described in FIGS. 2 to 16 and a description thereof will be omitted herein.

The receiving unit 1815 receives various messages from devices under a control of the control unit 1813. The various messages received in the receiving unit 1815 have been described in FIGS. 2 to 16 and a description thereof will be omitted herein.

The storage unit 1817 stores a program related to the operation for controlling the PDR selecting operation for the device in the base station 1800, various data, and the like. The storage unit 1817 stores the various messages which are received by the receiving unit 1815 from the devices.

While the transmitting unit 1811, the control unit 1813, the receiving unit 1815, and the storage unit 1817 are described in the base station 1800 as separate units, it is to be understood that this is merely for convenience of description. In other words, two or more of the transmitting unit 1811, the control unit 1813, the receiving unit 1815, and the storage unit 1817 may be incorporated into a single unit.

Certain aspects of the present disclosure may also be embodied as computer readable code on a non-transitory computer readable recording medium. A non-transitory computer readable recording medium is any data storage device that can store data, which can be thereafter read by a computer system. Examples of the non-transitory computer readable recording medium include read only memory (ROM), random access memory (RAM), CD-ROMs, magnetic tapes, floppy disks, optical data storage devices, and carrier waves (such as data transmission through the Internet). The non-transitory computer readable recording medium can also be distributed over network coupled computer systems so that the computer readable code is stored and executed in a distributed fashion. In addition, functional programs, code, and code segments for accomplishing the present disclosure can be easily construed by programmers skilled in the art to which the present disclosure pertains.

It can be appreciated that a method and apparatus according to an embodiment of the present disclosure may be implemented by hardware, software and/or a combination thereof. The software may be stored in a non-volatile storage, for example, an erasable or re-writable ROM, a memory, for example, a RAM, a memory chip, a memory device, or a memory integrated circuit (IC), or an optically or magnetically recordable non-transitory machine-readable (e.g., computer-readable), storage medium (e.g., a compact disk (CD), a digital versatile disk (DVD), a magnetic disk, a magnetic tape, and/or the like). A method and apparatus according to an embodiment of the present disclosure may be implemented by a computer or a mobile terminal that includes a controller and a memory, and the memory may be an example of a non-transitory machine-readable (e.g., computer-readable), storage medium suitable to store a program or programs including instructions for implementing various embodiments of the present disclosure.

The present disclosure may include a program including code for implementing the apparatus and method as defined by the appended claims, and a non-transitory machine-readable (e.g., computer-readable), storage medium storing the program. The program may be electronically transferred via any media, such as communication signals, which are transmitted through wired and/or wireless connections, and the present disclosure may include their equivalents.

An apparatus according to an embodiment of the present disclosure may receive the program from a program providing device which is connected to the apparatus via a wire or a wireless and store the program. The program providing device may include a memory for storing instructions which instruct to perform a content protect method which has been already installed, information necessary for the content protect method, and the like, a communication unit for performing a wired or a wireless communication with a graphic processing device, and a controller for transmitting a related program to a transmitting/receiving device based on a request of the graphic processing device or automatically transmitting the related program to the transmitting/receiving device.

While the present disclosure has been shown and described with reference to various embodiments thereof, it will be understood by those skilled in the art that various changes in form and details may be made therein without departing from the spirit and scope of the present disclosure as defined by the appended claims and their equivalents.

The invention claimed is:

1. A method for selecting a peer discovery resource (PDR) by a device in a device-to-device (D2D) communication system, the method comprising:
    determining a range comprising at least one PDR selected from PDRs usable in the D2D communications system;
    selecting a PDR in the range; and
    selecting another PDR different from the selected PDR upon detecting that a collision for the selected PDR occurs while using the selected PDR,
    wherein selecting the another PDR comprises extending the range upon detecting that the collision for the selected PDR occurs.

2. The method of claim 1, wherein the range is one of a plurality of PDR groups that are generated by grouping the PDRs.

3. The method of claim 1, wherein the range is selected based on a device identifier (ID) of the device,
wherein the range is randomly selected, or
wherein the range is determined based on a range allocated by a base station.

4. The method of claim 1, wherein the range is included in a peer discovery interval which is firstly started after the device accesses the D2D communication system.

5. The method of claim 1, wherein selecting the PDR in the range comprises:
selecting the PDR among the at least one PDR included in the range based on energy levels of corresponding PDRs,
randomly selecting the PDR among the at least one PDR included in the range, or
selecting the PDR among the at least one PDR included in the range based on unused PDR information that is received from a base station.

6. The method of claim 1, wherein extending the range comprises extending the range by including at least one range among other ranges that are usable in the D2D communication system into the range to be used in the device, and
wherein the at least one range is continuous with the range on a time axis, or the at least one range is not continuous with the range on the time axis.

7. The method of claim 1, wherein selecting the PDR in the range comprises selecting the PDR based on whether the at least one PDR included in the selecting range is used already.

8. The method of claim 1, wherein selecting the another PDR different from the selected PDR upon detecting that the collision for the selected PDR occurs while using the selected PDR comprises selecting the another PDR based on whether the at least one PDR included in the range is used already.

9. A device in a device-to-device (D2D) communication system, the device comprising:
a processor configured to:
determine a range comprising at least one peer discovery resource (PDR) selected from PDRs usable in the D2D communication system,
select a PDR in the range, and
select another PDR different from the selected PDR upon detecting that a collision for the selected PDR occurs while using the selected PDR,
wherein the processor is configured to extend the range upon detecting that the collision for the selected PDR occurs.

10. The device of claim 9, wherein the range is one of a plurality of PDR groups that are generated by grouping the PDRs.

11. The device of claim 9, wherein the range is selected based on a device identifier (ID) of the device,
wherein the range is randomly selected, or
wherein the range is determined based on a range allocated by a base station.

12. The device of claim 9, wherein the range is included in a peer discovery interval which is firstly started after the device accesses the D2D communication system.

13. The device of claim 9, wherein the processor is further configured to:
select the PDR among the at least one PDR included in the range based on energy levels of corresponding PDRs,
randomly select the PDR among the at least one PDR included in the range, or
select the PDR among the at least one PDR included in the range based on unused PDR information that is received from a base station.

14. The device of claim 9, wherein the processor is configured to extend the range by including at least one range among other ranges that are usable in the D2D communication system into the range to be used in the device, and
wherein the at least one range is continuous with the range on a time axis, or the at least one range is not continuous with the range on the time axis.

15. The device of claim 9, wherein the processor is configured to select the PDR based on whether the at least one PDR included in the range is used already.

16. The device of claim 9, wherein the processor is configured to select the another PDR based on whether the at least one PDR included in the range is used already.

* * * * *